United States Patent
Steinetz et al.

[19]

[11] Patent Number: 6,039,325
[45] Date of Patent: Mar. 21, 2000

[54] RESILIENT BRAIDED ROPE SEAL

[75] Inventors: Bruce M. Steinetz, Westlake; Lawrence A. Kren, Fairview Park, both of Ohio

[73] Assignee: The United States of America as represented by the Administrator of National Aeronautics and Space Administration, Washington, D.C.

[21] Appl. No.: 09/057,898

[22] Filed: Apr. 9, 1998

Related U.S. Application Data

[63] Continuation-in-part of application No. 08/739,342, Oct. 17, 1996, abandoned.

[51] Int. Cl.[7] .................................................. F16J 15/02
[52] U.S. Cl. ........................ 277/633; 277/528; 277/652
[58] Field of Search ............................... 277/633, 650, 277/652, 653, 654, 930, 943, 354, 528

[56] References Cited

U.S. PATENT DOCUMENTS

| | | |
|---|---|---|
| 1,078,333 | 11/1913 | Cole ........................................ 277/633 |
| 2,535,634 | 12/1950 | hubbard ................................. 277/633 |
| 4,441,726 | 4/1984 | Uhl ......................................... 277/230 |
| 4,576,081 | 3/1986 | Felthuis et al. ............................. 87/6 |
| 5,014,917 | 5/1991 | Sirocky et al. ..................... 239/265.11 |
| 5,082,293 | 1/1992 | Steinetz et al. ...................... 277/633 X |
| 5,265,890 | 11/1993 | Balsells ................................... 277/163 |
| 5,301,595 | 4/1994 | Kessie ......................................... 87/6 |
| 5,358,262 | 10/1994 | Roberts ................................... 277/230 |
| 5,657,998 | 8/1997 | Dinc et al. ............................... 277/653 |

*Primary Examiner*—Anthony Knight
*Assistant Examiner*—Karlena D. Schwing
*Attorney, Agent, or Firm*—Kent N. Stone

[57] ABSTRACT

A resilient braided rope seal for use in high temperature applications includes a center core of fibers, a resilient canted spring member supporting the core and at least one layer of braided sheath fibers tightly packed together overlying the spring member. The seal provides both improved load bearing and resiliency. Permanent set and hysteresis are greatly reduced.

37 Claims, 5 Drawing Sheets

RESILIENT BRAIDED ROPE SEAL

This application is a continuation-in-part of application (s) application Ser. No. 08/739,342 filed on Oct. 17, 1996, now abandoned.

ORIGIN OF THE INVENTION

The invention described herein was made by an employee of the United States Government and a contract employee working for the US Government, and may be manufactured and used by or for the Government for Government purposes without the payment of any royalties thereon or therefore.

TECHNICAL FIELD

This invention relates to sealing methods and structures. Specifically this invention relates to a sealing article particularly suitable for sealing gaps between adjacent components which are subjected to repeated cycling between extreme temperatures, such as components of advanced aerospace engines and vehicles.

BACKGROUND ART

Numerous types of seals and sealing methods are known in the prior art. Seals are commonly used for sealing gaps and spaces between adjacent components. In many situations the primary function of the seal is to enable relative movement of the adjacent components while minimizing flow of fluids between such elements. The relatively movable components are commonly subject to static and dynamic forces, including forces produced by relative movement of the components as well as forces produced by vibrations, fluid pressure and thermal expansion and contraction. Numerous factors affect the ability of a seal to effectively seal an area between adjacent components, including environmental conditions, seal resiliency, flexibility of the seal the thermal conductivity and expansion of adjacent components, seal seating, seal hysteresis, and other factors.

For example in advanced aerospace engines and vehicles, seals are desired which have the properties of high compressive strength and yet seal effectively throughout a broad temperature range. The components of such advanced aerospace engines and vehicles, are often comprised of ceramics, exotic metals, or composites capable of maintaining structural integrity at extremely high temperatures, often in excess of 1500 degrees Fahrenheit. For these reasons, advanced aerospace engines and vehicles require high temperature resilient seals to minimize fluid flow between adjacent components and/or to minimize engine purge/coolant requirements. Dimensional changes between components due to temperature variations during operation and the adjacent positioning of components made of materials having widely different coefficients of thermal expansion (CTE), require seals that maintain resiliency and resistance to fluid flow through a broad range of dimensional and temperature changes. Seals employed in such applications are required to maintain preload with adjacent components during transient and steady-state conditions.

The seals known in the prior art to have some deficiencies limiting their ability to meet design requirements in applications such as advanced aerospace engines and vehicles, and other applications which require sealing between relatively movable components comprised of dissimilar materials which undergo repeated high temperature cycling.

Some conventional braided rope seals such as disclosed in U.S. Pat. No. 5,358,262 provide resiliency, or spring-back, for short-term applications. However, as advanced alloy materials such as intermetallics (e.g. nickel-aluminides, titanium-aluminides, etc.), carbon-carbon composites, and ceramic matrix composites find use in advanced aerospace structures, and other devices requiring extended use over a plurality of cycles, seals are required that exhibit significantly higher levels of resiliency without sacrificing temperature capability.

Some braided rope seals such as disclosed in U.S. Pat. No. 5,358,262 have an inner metallic braided sheath and an external ceramic sheath. Such seals are used as a high temperature seal between a ceramic component and a metallic component. The seal member includes a multi-layer 0-ring seal composed of a bundle of uniaxial elongate ceramic fibers over-laid by a sheath of braided metal wire that is over-laid by a sheath of braided ceramic fibers.

U.S. Pat. No. 5,332,239 discloses a bellows seal made of a central bellows with a plurality of convolutions therein. The bellows is over-laid by a braided ceramic sheath which is over-laid by an outer abrasion-resistant sheath. A coolant may be circulated through the hollow interior of the bellows.

U.S. Pat. No. 5,301,595 discloses a high temperature rope seal for joint packing having a cylindrical core made of bundled and twisted ceramic fibers. The core is covered by a metallic cover made of a plurality of cross woven strands. Each cross woven strand includes a plurality of round stainless steel wires arranged side-by-side.

U.S. Pat. No. 5,082,293 discloses a high temperature, flexible, fiber-preform seal mounted in a groove in a moveable panel structure. The seal has a uniaxial core with a plurality of fibers encircled by an internal layer of spiral wound fibers. This internal layer is encircled by a plurality of left-hand and right-hand helical fibers that are encircled by an external layer of spiral wound fibers.

U.S. Pat. No. 4,576,081 discloses a ceramic sealing rope with one or more sleeves of woven cross wire surrounding a core strand. Each core strand comprises a plurality of yarns where each yarn surrounds a solid metal wire.

U.S. Pat. No. 1,078,333 discloses a low performance packing material having a core of longitudinally extending fiber and rubber strands. The core of the packing material is covered by an intermediate layer of wound fiber and rubber strands. The intermediate layer is covered with an outer wrap of fiber strands.

U.S. Pat. No. 5,161,806 shows a resilient seal construction which has a canted coil spring surrounding a hollow core. The areas intermediate of the spring coils are filled with a resilient material to block fluid flow between the coils.

None of these prior art seals have properties which perform as well as would be desirable in applications which require sealing between relatively movable components comprised of dissimilar materials which undergo repeated high temperature cycling to temperatures ranging to about 1500 degrees Fahrenheit.

Thus there exists a need for a sealing article and method, that provides enhanced fluid resistance, greater resiliency, improved maintenance of preload with adjacent components, greater flexibility, high load bearing capability, reduced permanent set, less hysteresis, and longer life, when used in sealing between components in advanced aerospace engines and vehicles and other devices which are subjected to extreme thermal changes.

DISCLOSURE OF INVENTION

It is an object of the present invention to provide an improved sealing article.

It is a further object of the present invention to provide an improved sealing article for providing a generally low leakage fluid seal between adjacent components which are subject to relative movement, vibrations, internal pressures, and temperature changes.

It is a further object of the present invention to provide an improved resilient sealing article to seal gaps between adjoining components of advanced aerospace engines and vehicles.

It is a further object of the present invention to provide a sealing article capable of remaining resilient at very high temperatures and when exposed to large temperature differentials.

It is a further object of the present invention to provide a sealing article having sufficient resiliency to seal between components comprised of advanced structural materials, including intermetallics or ceramic matrix composites, among others.

It is a further object of the present invention to provide a sealing article providing improved resiliency without sacrificing temperature capability.

It is a further object of the present invention to provide an improved seal that exhibits improved resiliency while exhibiting less permanent set and less hysteresis when cyclically exposed to high temperatures.

Further objects of the present invention will be made apparent in the following Best Modes for Carrying Out Invention and the appended claims.

The foregoing objects are accomplished by an improved sealing article for use in high temperature applications. The sealing article includes a crush resistant center core. A resilient spring member extends in surrounding relation of the center core. The spring member maintains stiffness and load carrying characteristics while providing resiliency in a load bearing direction. A cover including at least one fiber layer extends in surrounding relation of the core and spring member.

In alternative embodiments, the spring member includes a plurality of coils and the space between the coils is wrapped or filled with filler fibers, to enhance leakage and crush resistance characteristics. In other alternative embodiments, a passage extends in the center core to provide fluid pressure for further supporting the seal and a flow path for a cooling fluid.

BRIEF DESCRIPTION OF DRAWINGS

Preferred embodiments of the invention, illustrative of the best modes contemplated for applying the principles of the invention, are set forth in the following description and are shown in the drawings and are particularly and distinctly pointed out and set forth in the appended claims.

BEST MODES FOR CARRYING OUT INVENTION

Figure 1:
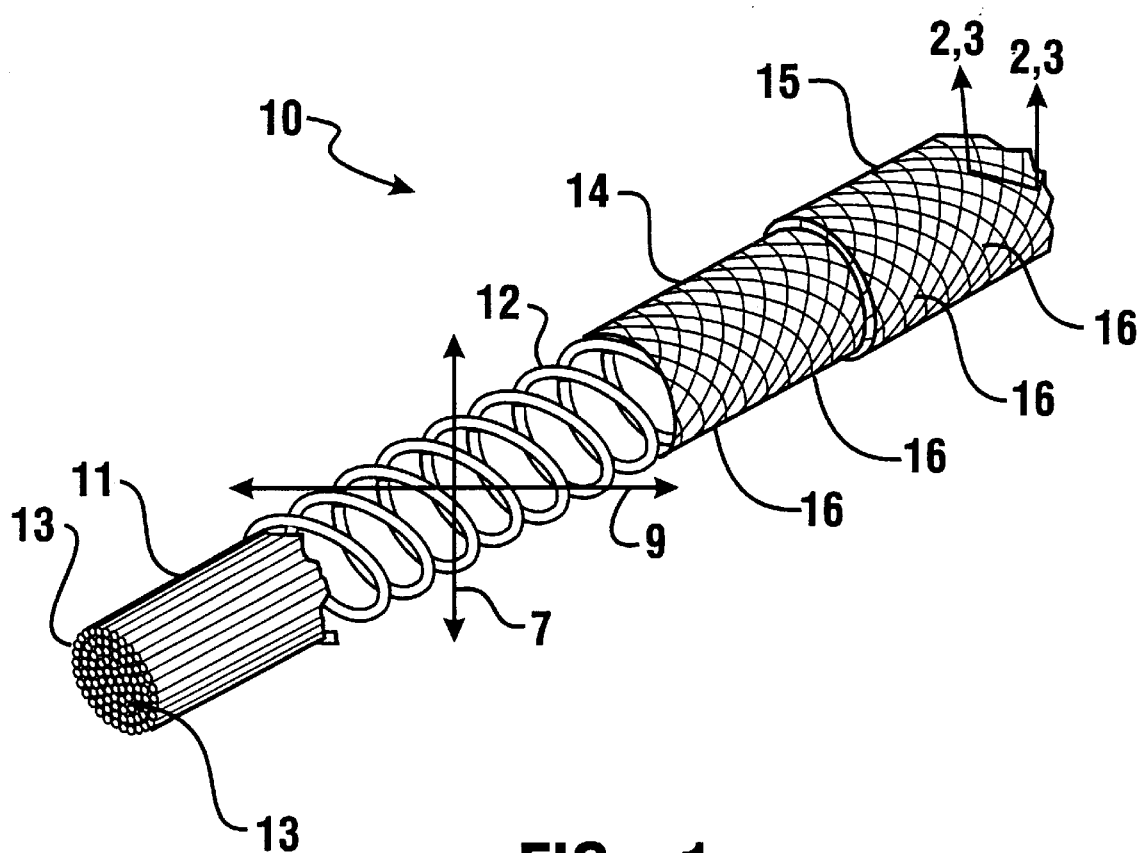
FIG. 1 is a perspective view of one first preferred embodiment of a sealing article of the present invention.

Referring now to the drawings, and particularly to FIG. 1 there is shown therein a sealing article in the form of a resilient braided rope seal indicated generally as 10. This resilient braided rope seal 10 includes a flexible center core 11, a resilient spring member 12, and a cover overlying the core and spring member. The cover may be comprised of a single sheath layer or several sheath layers. In the embodiment shown core 11 of braided rope seal 10 includes a plurality of fibers 13 covered by resilient spring member 12, an inner sheath layer 14 and one or more outer sheath layer(s) 15. Inner sheath layer 14 and outer sheath layer 15 each include a plurality of sheath fibers 16.

Spring member 12 is wrapped around core 11 in a helical fashion to add resiliency to seal 10. Spring member 12 provides resistance to lateral loads applied to said seal generally along a load bearing direction generally indicated 7. The spring member extends in supporting connection with the core. Depending on stiffness requirements in a particular application in which the seal is engineered for use, the spring member 12 may be wrapped either tightly or loosely around the core 11.

The single or multiple layers of fibers 14 and 15 which comprise the seal cover are braided around resilient member 12. In one optimal configuration the fibers are arranged to minimize fluid leakage or permeability through the seal structure in a sealing direction 9 which is generally perpendicular to the load bearing direction.

Core 11 is preferably crush, leakage, and heat-resistant and may be manufactured of any suitable material which provides these critical characteristics. As indicated above, the preferred embodiment of core 11 includes a plurality of fibers 13 uniaxially extending generally in a longitudinal direction in an elongated, parallel, and contiguous manner with reference to one another. The fibers comprising core 11 may also be twisted relative to the longitudinal axis. Furthermore, the core 11 can be comprised of braided fibers using 2-, 3-, or multi-dimensional braiding techniques.

The dimensions of each of the fibers and the plurality of all fibers making up the core are preferably optimized to meet the preferred minimum permeability and flexibility/stiffness constraints which may be controlled by changing individual and overall fiber diameters. Core 11 is designed to provide additional compressive stiffness to the seal beyond that which the spring member 12 provides. The core also supportingly engages an inner surface of the coils of the spring member facing the core. The engagement of the core with the inner surface of the coils limits the total amount of seal deformation either under normal operating conditions or under extreme cases to recover resilient deformation in the load bearing direction. The core thus prevents deformation beyond a point where excessive deformation or an over-temperature condition could permanently yield and deform the resilient spring member.

Core 11 is preferably comprised of candidate materials which include but are not limited to ceramic fibers such as alumina, alumina-silica or alumina-boria-silica, silicon nitride, silicon carbide, carbon fibers or hybrid fibers, and for lower temperature applications, glass fibers.

In accordance with one of the main features of the present invention, resilient spring member 12 provides the initial stiffness of the seal, a substantial load carrying capability, and the significant working deflection in the load bearing direction required in many sealing applications to accommodate relative thermal growths and distortions. Resilient spring member 12 is preferably comprised of a material which provides these critical characteristics of stiffness and resiliency and resists permanent deformation at high temperatures.

Figure 6:
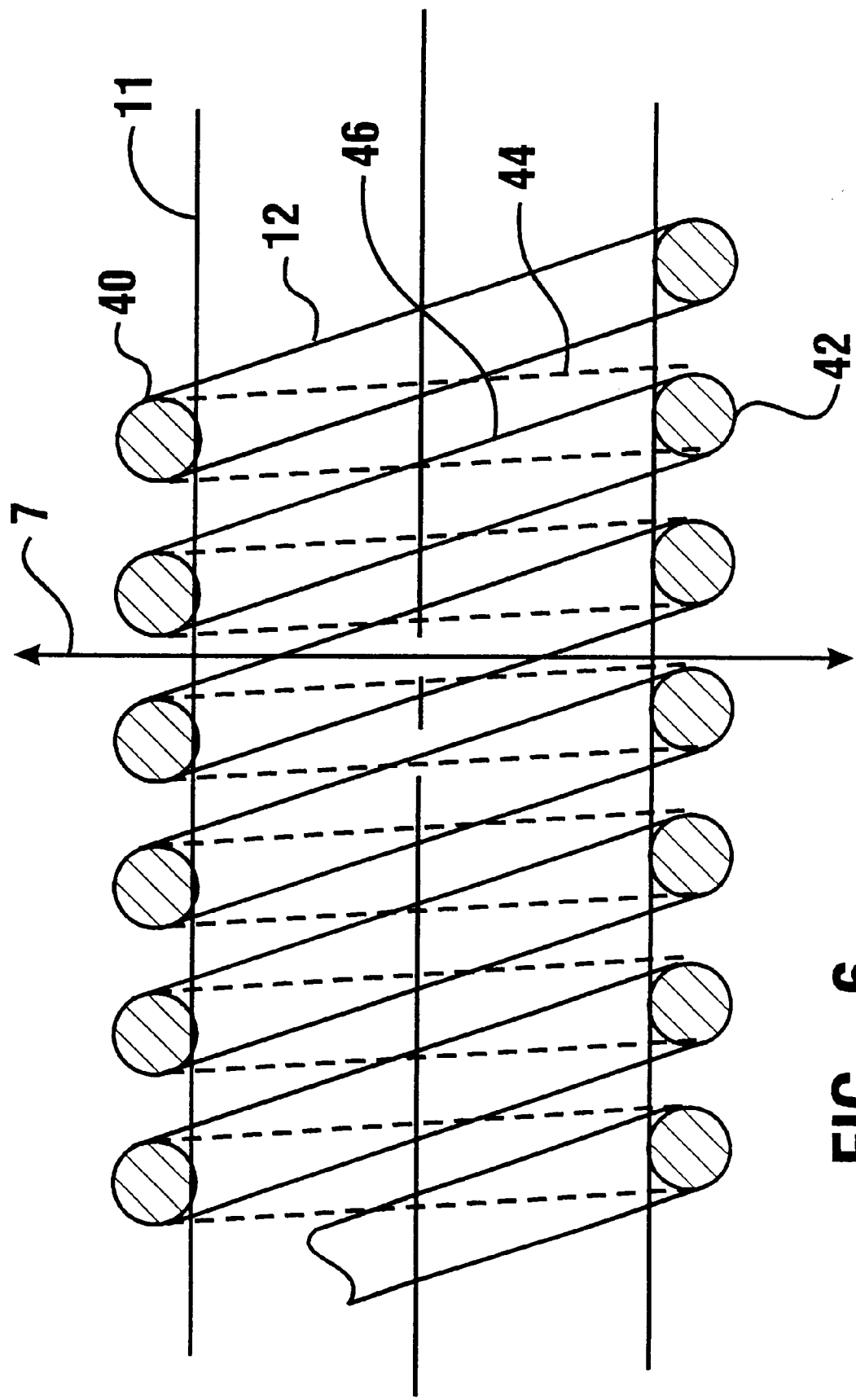
FIG. 6 is a side cross sectional view of the spring member and core portions of the sealing article of FIG. 1.

As best shown in FIG. 6, the preferred embodiment of the resilient spring member 12 is a canted coil spring of a helical configuration that is wrapped around core 11 to provide a supporting connection therewith. Depending on the requirements of the application in which the seal is engineered for use the resilient spring member 12 is wrapped either relatively tightly or loosely around the flexible core 11. For instance the resilient spring member 12 may be wrapped relatively tightly around the core 11 where the loads are great and crush resistance is paramount. Each coil of resilient spring member 12 is canted, or angled, relative to the load bearing direction 7 which extends in the vertical plane as shown in FIG. 6, to enhance flexibility of the resilient spring member 12 and the overall seal structure. Resilient spring member 12 is enabled to deflect along the load bearing direction while maintaining preload of the seal against adjacent components.

As best shown in FIG. 6 the canted coils of spring member 12 extend in generally abutting connection with opposed sides of core 11. In the cross section of the sealing article taken generally in the plane of the sealing direction, first sections 40 extend on a first side of core 11 while second sections 42 extend on an opposed side of the core. First arcuate spring segments 44 (shown in phantom) connect the first sections to the second sections, while second segments 46 connect the second sections 42 to the first sections. It should be noted that each first section 40 is longitudinally disposed from each adjacent first section. Likewise each second section 42 is longitudinally disposed from each adjacent second section.

Each first segment 44 is generally parallel to and disposed longitudinally from each of the immediately adjacent first segments. Likewise each second segment 46 is generally parallel to and disposed from each of the immediately adjacent second segments. It should be noted that relative to the load bearing direction, the first and second segments extend at a substantial acute angle. This enables resilient torsional deformation of the spring member in response to loading in the load bearing direction. Each coil of spring member 12 extending between adjacent first sections 40, for example the two first sections 40 shown on the right in FIG. 6, have an intermediate second section 42. Second section 42 is disposed somewhat further longitudinally to the right relative to the first section of the coil disposed furthest to the right. The fact that the first and second segments of the spring member are relatively angled or canted in this manner enables the spring member to resiliently twist and flatten in response to forces applied in the load bearing direction, and then recover. This would not be achievable if the segments were not disposed at a substantial acute angle relative to the load bearing direction because the loading force would permanently flatten a coil segment extending parallel to the load bearing direction.

As previously discussed, in the preferred embodiment the deformation of the spring member is limited to a range where the seal elastically deforms short of the point where the spring member would substantially non elastically deform and take on a permanent set. This is achieved by the engagement of an inner surfaces of the spring member in the areas of first and sections 40, 42 with the relatively less deformable, crush resistant core 11. Inner surfaces of both the first or second coil segments may operatively engage the core to provide support for the seal along the sealing direction, or alternatively only an inner surface of one group of segments may operatively engage the core if the seal need only resist flow one way along the sealing direction. Spring member 12 may comprise a continuous canted helical spring as shown or other spring members having comparable properties to those described herein. The spring member 12 may be generally elliptical in a transverse cross section, including various oval or circular shapes, or may have other configurations.

Resilient spring member 12 will deflect in response to loading in the loading direction when positioned between abutting components subject to structural, thermal, or aerodynamic loads. While resilient member 12 may be manufactured of a variety of materials and in a variety of configurations, in one preferred embodiment, it is comprised of a high temperature, creep resistant materials such as Inconel X-750, Waspalloy, AEREX 350, MAR-M247, Rene '41, MA 956, Inconel 601, Inconel 617, Haynes 25, 188, 230, or 214. One such canted coil spring member configuration is commercially available from Bal Seal Engineering Company, Inc, of Santa Ana, Calif. 92707-3398.

The cover of the sealing article which includes one or several sheath layers, such as tightly braided sheath layers 14 and 15, acts to limit fluid flow through the seal, while retaining seal resiliency and flexibility. Such flow resistance is generally required in the sealing direction 9 which is generally perpendicular to the load bearing direction and the longitudinal axis of the seal. Sheath elements 14 and 15 respectively are configured to provide high fluid flow resistance throughout the entire seal circumference. The sheath layer(s) are preferably comprised of tightly braided sheath elements or fibers 16 extending around core 11 and resilient spring member 12, so as to minimize flow through the sheath. Braid tension between the sheaths(s) 14 and 15 and the resilient spring member 12 is preferably optimized for a given application. For instance, where virtually no seal deflection is required under part-load conditions the braided layer(s) 14 and 15 may be made to tightly encapsulate the resilient spring member 12. Only after the applied force exceeds the internal force will the seal compress.

Figure 2:
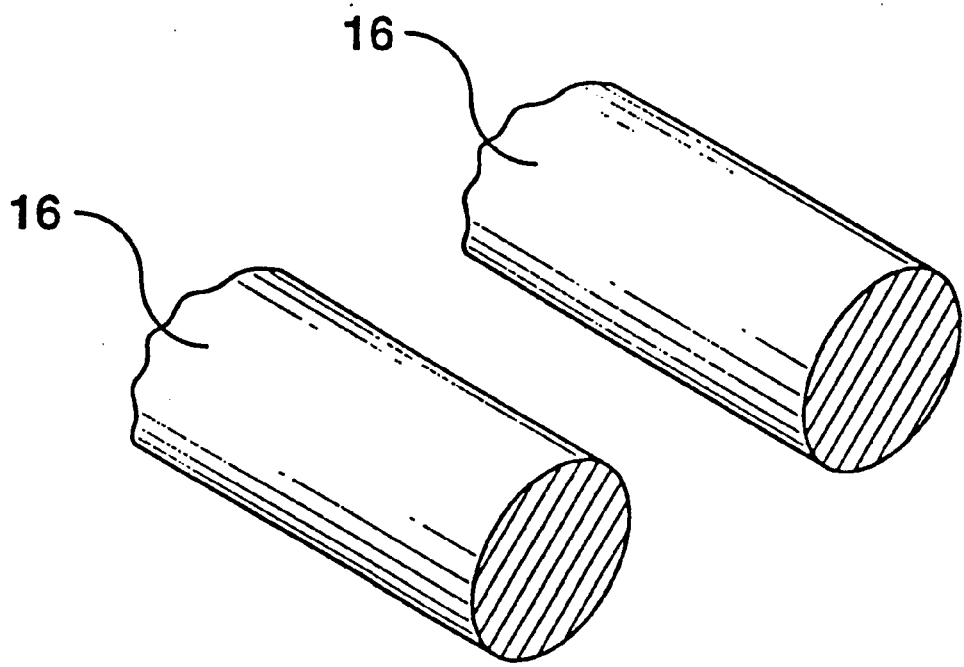
FIG. 2 is an enlarged perspective view of a first type of sheath fiber having a circular cross-section used in the sealing article of FIG. 1.
Figure 3:
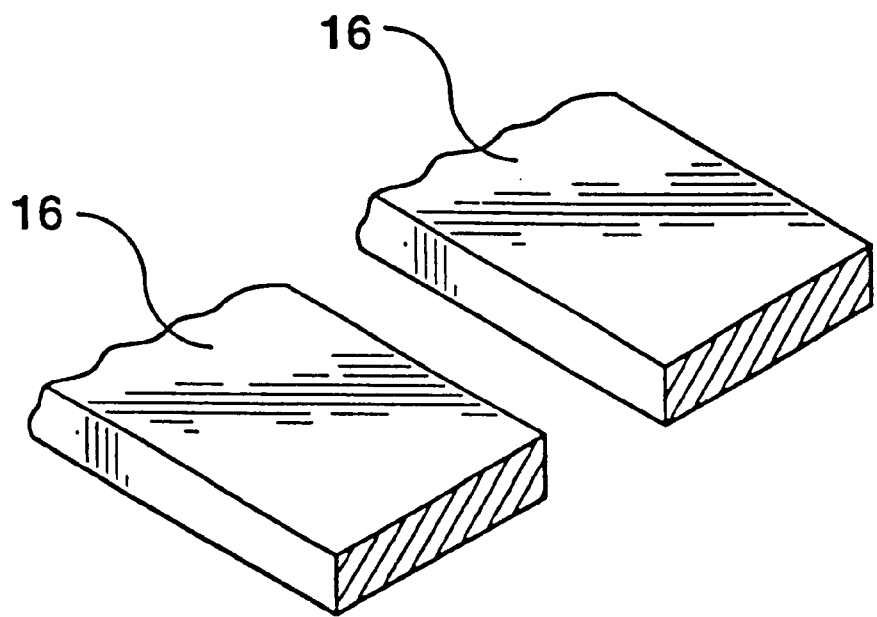
FIG. 3 is an enlarged perspective view of an alternative type of sheath fiber having a rectangular cross-section.

Fibers 16 braided in sheath layers of the seal may have a variety of sizes and configurations. However, in one preferred embodiment, the fibers may have either a circular or rectangular cross-sectional configuration such as shown in FIG. 2 or FIG. 3 respectively. Each of the fibers 16 includes fine surface and structural features that minimize parasitic leakage through the areas of contact between the seal 10 and the adjacent components.

Fibers 16 may be manufactured of any suitable material which limits flow and remains resilient and flexible. In one preferred embodiment, where durability is important, fibers are wires or ribbons comprised of high temperature, oxidation resistant superalloys such as Inconel X-750, Waspalloy, AEREX 350, MAR-M-247, Rene '41, MA 956, Inconel 601, Haynes 25, 188, 230, or 214. Alternatively, where limited scrubbing between the seal and the surrounding components occurs, fibers 16 may be comprised of ceramic fibers such as alumina-silica or alumina-boria-silica, silicon nitride, silicon carbide, carbon fiber, or hybrid fibers, or for some lower temperature applications the fibers 16 may be comprised of glass fibers, without departing from the teachings of the present invention.

Overall, the combined stiffness, resiliency, and substantial load carrying capability of resilient spring member 12 when wrapped around and thus operatively coupled with the minimum permeability and flexible core 11, and when further combined with the fluid flow limiting capability of sheath layers 14 and 15, results in a significantly improved seal for cyclical high temperature applications, such as in aerospace engines and vehicles.

Specifically, rope seal 10 exhibits resiliency improvements over the known conventional braided seal technology. During initial cycling of resilient rope seal 10, the seal exhibits significantly less permanent-set in the load bearing direction (non-recoverable deformation) than conventional braided seals. Specifically, it was found that resilient rope seal 10 having a resilient spring member 12 exhibits less than 20% of the permanent set of conventional braided rope seals. By way of example, a conventional seal experiences 0.020 in. of hysteresis in a first test cycle, while a comparably dimensioned seal of the present invention tested under identical conditions exhibits hysteresis in a first cycle in a range of from 0.003 to 0.005 in.

Another important factor in constructing braided rope seals is load bearing capability. It is desirable for seals to exhibit a uniform load versus deflection characteristic. When seals exhibit such a characteristic there is greater assurance of ongoing reliable sealing of adjacent components. Resilient braided rope seal 10 achieves generally uniform load versus deflection properties after significantly fewer conditioning cycles than conventional braided rope seals. Specifically, resilient rope seal 10 with resilient member 12 achieves generally uniform load versus deflection properties in about 1/10th or less the number of cycles as are required by conventional braided rope seals without a resilient spring member 12. Specifically, a conventional seal often requires 100 cycles to achieve consistent uniform load versus deflection properties, while the seal of the present invention responds consistently after only about 9 cycles.

Another important benefit of braided rope seals of the invention is stiffness coupled with flexibility. Stiffness is critical for maintaining preload and biasing engagement with adjacent components across the operating range of temperatures and relative positions. Resilient braided rope seal 10 with resilient spring member 12 maintains a higher stiffness during loading than conventional braided rope seals. Specifically, the resilient braided rope seal 10 with resilient member 12 exhibited twice the part-load stiffness of conventional braided rope seals. Therefore, braided rope seal 10 having the resilient spring member 12 provides new levels of seal resiliency, seal flexibility, load carrying capabilities, deflection characteristics, and minimization of permanent set and hysteresis without sacrificing flow resistance. The result is that the improved braided rope seal of the invention provides the required properties needed in a seal used in advanced aerospace engines and vehicles as well as in other applications, where it is required to seal gaps over a wide range of temperatures and in which the components adjacent the gap to be sealed experience significant relative thermal expansion and distortion.

Figure 4:
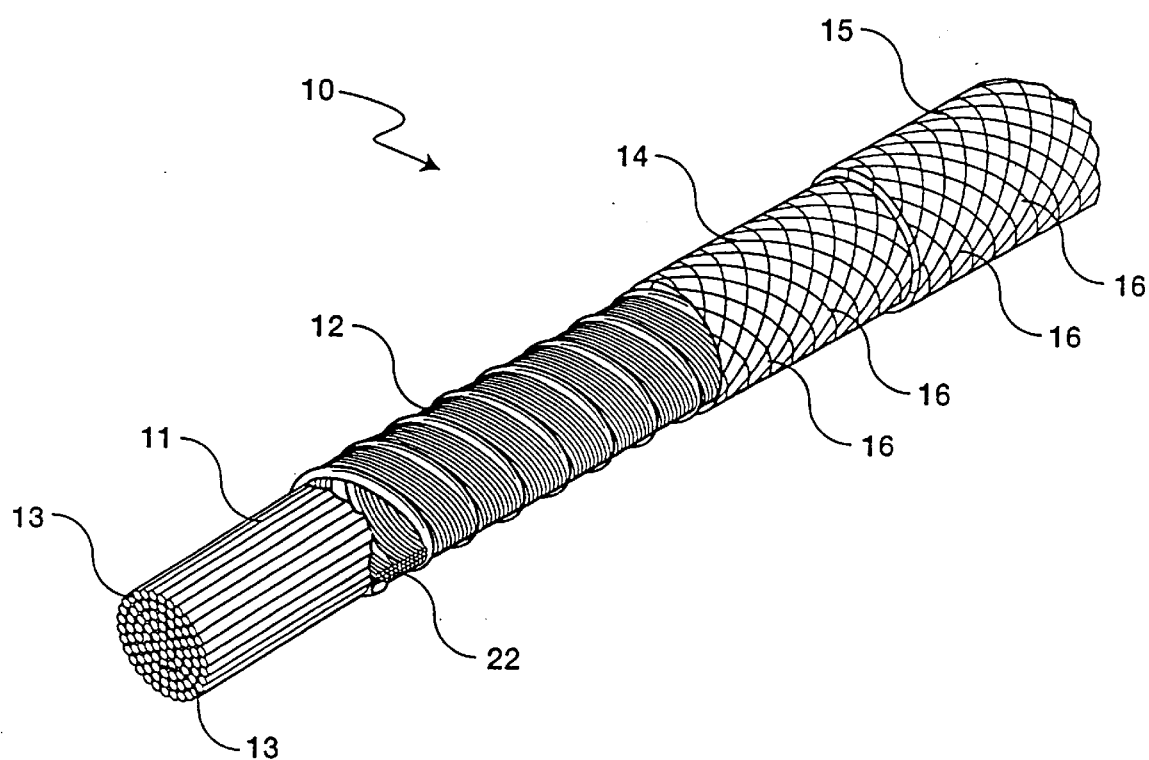
FIG. 4 is a perspective view of a first alternate embodiment of a sealing article of the invention in which filler fibers extend in spaces between coils of a spring member.

Referring now to FIG. 4, there is shown a second embodiment of the invention. This embodiment includes a plurality of coil filler fibers 22 which extend circumferentially around core 11 and intermediate each pair of adjacent coils of spring member 12 in order to fill the longitudinal void between such coils. Filling the space between the coils blocks a potential leakage flow path. Furthermore filling this void reduces the possibility of the resilient spring member 12 causing abrasion to inner sheath 14. As shown in FIG. 4 filler fibers 22 preferably include a plurality of overlying fiber layers which extend outward from adjacent the core to about the height of the coils. Filler fibers 22 are particularly useful where low leakage is required. Fibers 22 may be manufactured of a variety of materials, but in the preferred embodiment are manufactured of a superalloy or ceramic material in order to provide sufficient flow and heat resistance.

Figure 5:
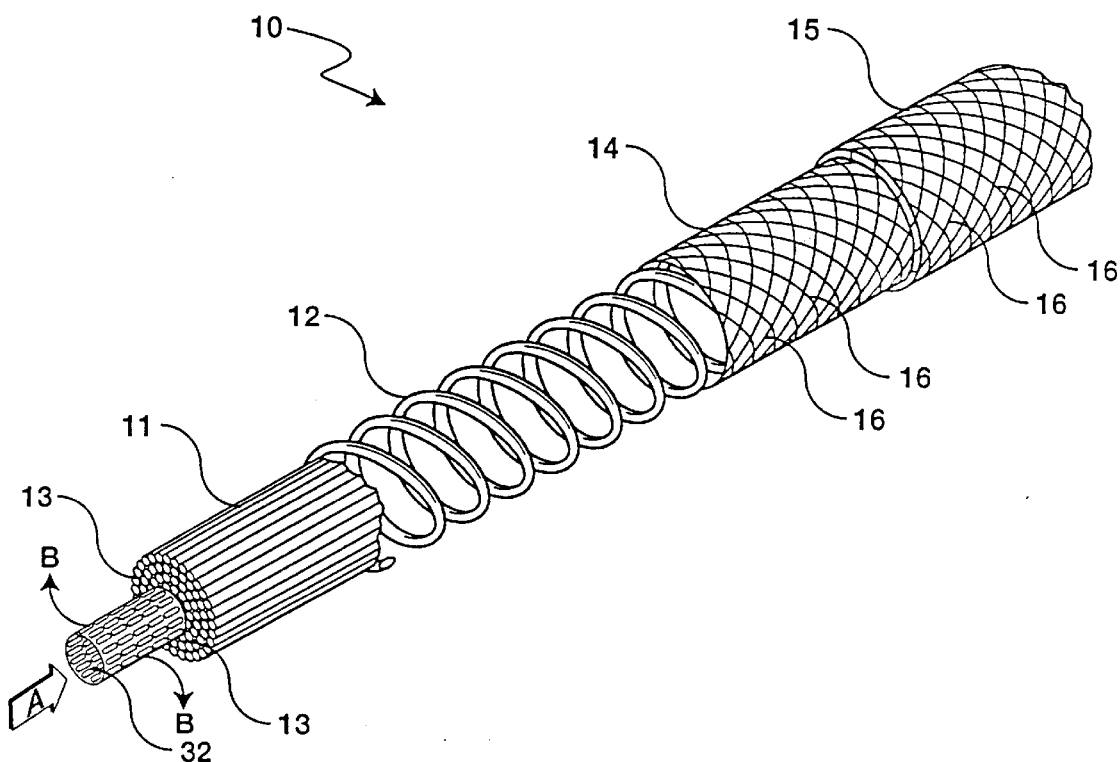
FIG. 5 is a perspective view of an alternate embodiment of a sealing article of the invention wherein a porous passage extends in the core of the sealing article for supplying supporting fluid pressure and/or a cooling fluid.

Referring now to FIG. 5, there is shown a third embodiment of the invention. A fluid passage which in the embodiment shown is a porous cooling tube 32, extends in the core 11. The porous cooling tube 32 in the center of the seal enables the flow of a seal purge gas as shown by arrow A. The use of this central cooling tube is required at axial engine stations where gas temperatures exceed the maximum use temperature of the seal. The seal purge gas pressure also can be used to provide added support and inflate the seal structure increasing preload and enhancing sealing contact with the adjacent seal surfaces.

The porous cooling tube 32 is designed to serve as a manifold for delivering high pressure coolant gas at locations where the surrounding temperatures are higher than the seal material limits. Selecting an inert purge coolant gas such as helium, flowing radially outward through the wall of the seal as indicated by the arrows B, accomplishes two important functions. The gas cools the seals, and it provides a positive purge of an inert gas to prevent the leakage of potentially explosive fuel-oxygen mixtures common in engine combustion chambers.

In addition to the uses of the sealing article of the invention discussed in connection with FIGS. 1, 4 and 5, it is contemplated that seals of the invention can be used to seal tubes in industrial applications such as heat exchangers, chemical conversion systems, gas reaction systems, and tube boilers and furnaces. It is contemplated that the seals of the invention may be used to seal interfaces in turbine engines including combustor cases, and combustor to nozzle joints, among other applications. Sealing articles of the present invention can also be used as compliant mounts and/or as seals between advanced structural materials such as intermetallics (nickel-aluminides, titanium-aluminides, etc.), carbon-carbon composites, and ceramic matrix composites used in advanced aerospace systems. Specifically the seals can serve as a combined compliant mount/seal between an intermetallic turbine vane and adjoining superalloy shrouds.

It is contemplated that sealing articles of the present invention may also be used as aerospace vehicle thermal protection system (TPS) panel seals, airframe seals, such as landing gear door seals, elevon control surface seals, rudder control surface seals, body-flap control surface seals, forward canard control surface seals, and crew access door seals. Seals of the invention may also be used to seal space vehicle propulsion system joints including, but not limited to, solid rocket motor casings, nozzle-to-casing joints, aersopike engine joints, nozzle ramp thermal protection systems, and others. Seals of the invention may also be used to seal panel-to-panel joints in fixed and variable exhaust systems such as those contemplated for advanced commercial and military supersonic aircraft.

It is further contemplated that sealing articles of the present invention may be used in high temperature furnace expansion joints, and the like where furnace panel growth is encountered. The sealing article of the present invention may also be used to seal joints in high temperature molds or to seal locations in continuous casting processes. Seals of the invention may also be used to seal joints in glass or other high temperature processing systems.

The improved resilient braided rope seal of the present invention provides an effective, more reliable, and efficient sealing article which achieves the enumerated objectives, provides for eliminating difficulties encountered with prior devices, and solves problems and attains the desirable results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations given herein are by way of examples and the invention is not limited to the exact details shown and described.

In the following claims any feature described is a means for performing a function shall be construed as encompassing any means capable of performing the recited function and known to those skilled in the art, and shall not be deemed limited to the particular means shown in the foregoing description performing the recited function or means merely equivalent thereto.

Having described the features, discoveries and principals of the invention, the manner in which it is constructed, operated and utilized, and the advantages and useful results attained; the new and useful structures, devices, elements, arrangements, parts, combinations, systems, equipment, operations, methods and relationships are set forth in the appended claims.

What is claimed is:

1. A scaling article comprising:
   a core having crush resistance properties in a load bearing direction and fluid flow resistance properties in a sealing direction generally perpendicular to the load bearing direction, wherein the core extends in a longitudinal direction generally perpendicular to both the load bearing direction and the sealing direction;
   a spring member, wherein the spring member includes a plurality of coils, wherein each coil in the plurality of coils extends in surrounding relation of and in supporting connection with the core, and wherein in transverse cross section along the load bearing direction each coil includes a first coil section on a first side of the core and a second coil section at an opposed side of the core, and wherein a coil segment extends between the first and second sections of each coil whereby each coil includes two coil segments, and wherein each first coil section is disposed away from each immediately longitudinally adjacent first coil section, and wherein each coil segment is disposed away from and extends generally parallel to each immediately longitudinally adjacent coil segment, and wherein each of the two coil segments which comprise each coil is disposed at a substantial acute angle in the same angular direction relative to the load bearing direction, wherein the spring member is resiliently deformable in the load bearing direction; and
   a generally impervious cover extending longitudinally and in generally surrounding overlying relation of the core and the spring member.

2. The article according to claim 1 wherein generally each coil of the spring member extends in cross section between one first section and an immediately longitudinally adjacent second first section, and wherein the second first section is disposed in a first longitudinal direction from the one first section, and wherein one second section is disposed in the spring member between the one first section and the second first section, and wherein the one second section is positioned in an opposed longitudinal direction relative to the one first section.

3. The article according to claim 1 wherein each coil of the spring member is in supporting connection with the core in each first coil section and at each second coil section.

4. The article according to claim 3 wherein generally each coil of the spring member includes a first inner surface, wherein the first inner surface extends in facing relation relative to the core between the first coil section and the second coil section, and wherein the first inner surface is in supporting connection with the core along substantially the entire length of the first inner surface.

5. The article according to claim 3 wherein generally each coil of the spring member includes a second inner surface, wherein the second inner surface extends in facing relation relative to the core between the second section and the first section of the coil, and wherein the second inner surface is in supporting connection with the core along substantially the entire length of the second inner surface.

6. The article according to claim 1 wherein generally each coil of the spring member includes an inner surface, wherein the inner surface extends in facing relation relative to the core and in substantially surrounding relation relative to the core, and wherein the inner surface is in supporting connection with the core substantially along the entire length of the inner surface.

7. The article according to claim 1 wherein the spring member includes a canted helical spring.

8. The article according to claim 1 wherein the core in a transverse cross section perpendicular to the longitudinal direction is substantially elliptical in cross section.

9. The article according to claim 1 wherein the core is generally nondeformable relative to the spring member in the load bearing direction, wherein the core is sized relative to the surrounding coils of the spring member such that the core supports the spring to prevent compressive deformation of the spring in the load bearing direction substantially beyond a point of nonelastic deformation.

10. The article according to claim 1 wherein the cover comprises at least one layer, wherein said layer comprises a plurality of fibers and wherein said layer extends in overlying and in surrounding relation of the spring member.

11. The article according to claim 10 wherein the at least one layer of fibers comprises an inner layer generally tightly braided around the spring member and an outer layer generally tightly braided in overlying relation around the inner layer.

12. The article according to claim 11 wherein each of the inner layer and the outer layer comprises a plurality of tightly packed sheath fibers.

13. The article according to claim 12 wherein the plurality of lightly packed sheath fibers include high temperature, oxidation resistant superalloys.

14. The article according to claim 13 wherein the high temperature, oxidation resistant superalloys include at least one of the group of Inconel X-750, MAR M 247, Waspalloy, AEREX 350, Rene '41, MA 956, Inconel 601, Inconel 617, Haynes 25, 188, 230; and 214.

15. The article according to claim 10 wherein each fiber of the plurality of fibers has a generally circular cross section.

16. The article according to claim 10 wherein each fiber of the plurality of fibers has a generally rectangular cross section.

17. The article according to claim 10 wherein the layer of fibers includes fibers comprised of alumina-silica ceramic.

18. The article according to claim 1 wherein the spring member is comprised of a high temperature, creep resistant superalloy.

19. The article according to claim 18 wherein the high temperature, creep resistant alloy includes at least one of the group of Inconel X-750, MAR M 247, Waspalloy, Rene '41, MA 956, Inconel 601, Haynes 25, 188, 230, and 214.

20. The article according to claim 1 wherein the core comprises a plurality of fibers extending in generally parallel, contiguous relation and in generally the longitudinal direction.

21. The article according to claim 20 wherein the core fibers include alumina-silica ceramic.

22. The article according to claim 20 where the core fibers include at least one of a group of fibers including alumina-boria-silica ceramic, alumina ceramic, silicon carbide ceramic, silicon nitride ceramic, carbon, and hybrid ceramic.

23. The article according to claim 10 wherein the layer of fibers includes fibers comprised of at least one of a group of fibers including alumina-boria-silica ceramic, alumina ceramic, silicon carbide ceramic, silicon nitride ceramic, carbon, and hybrid ceramic.

24. The article according to claim 10 wherein the layer of fibers includes fibers comprised of at least one of a group of fibers including Inconel X-750, MAR M 247, MA956, MA754, Waspalloy, Iconel 617, Inconel 601, Haynes 25, Haynes 188, Haynes 230, and AEREX 350.

25. The article according to claim 1 wherein the spring member is comprised of alumina ceramic.

26. The article according to claim 1 wherein the spring member comprises at least one of a group of materials including alumina-boria-silica ceramic, alumina ceramic, silicon carbide ceramic, silicon nitride ceramic, carbon, and hybrid ceramic.

27. The article according to claim 1 wherein the spring member is comprised of at least one of a group of materials including MAR M 247, MA956, MA754, Inconel 601, Inconel 617, Inconel X-750, Haynes 25, Haynes 188, Haynes 214, Haynes 230, and AEREX 350.

28. The article according to claim 1 and further comprising at least one coil filler fiber wrapped in surrounding relation of the core and intermediate of the core and the cover, and wherein the filler fiber generally extends longitudinally intermediate and in generally parallel relation to the coils of the spring member.

29. The article according to claim 28 wherein the spring member extends in helically wound surrounding relation relative to the core and wherein the coil filler fiber is generally continuously wrapped and extends between the coils of the spring member.

30. The article according to claim 28 and further comprising in transverse cross section a plurality of longitudinally disposed coil filler fibers extending between at least one first pair of immediately longitudinally adjacent first sections and at least one second pair of immediately longitudinally adjacent second sections.

31. The article according to claim 30 wherein the plurality of filler fibers extending between the first and second pairs include in cross section, a first layer of filler fibers immediately adjacent to the core, and a second layer of filler fibers, the second layer being disposed in generally overlying relation of the first layer, wherein the cover extends in overlying relation of the second layer.

32. The article according to claim 28 wherein the filler fiber comprises at least one of superalloy and ceramic material.

33. The apparatus according to claim 1 and further comprising, a passage extending generally in the longitudinal direction in the core, whereby a cooling fluid is enabled to be passed through the passage.

34. The article according to claim 33 wherein the passage is porous, wherein fluid is enabled to pass from the passage into the core.

35. Apparatus comprising:
a primary structure;
a support structure; and
the sealing article according to claim 1 extending between and biasingly engaging both the primary structure and the support structure.

36. The apparatus according to claim 35 wherein the primary structure includes a turbine vane and the support structure includes a turbine vane shroud.

37. The apparatus according to claim 35 wherein the primary structure includes a nozzle element and the support structure includes a wall bounding the nozzle, wherein the nozzle element is movable relative to the nozzle wall.

* * * * *